United States Patent [19]

Kawano et al.

[11] Patent Number: 4,876,103
[45] Date of Patent: Oct. 24, 1989

[54] PROCESS FOR MAKING MEAT PRODUCTS CONTAINING A KONJAC MANNAN GEL

[75] Inventors: Ikuo Kawano; Tsuyoshi Takiguchi; Norihisa Kimura; Yohei Yanagisawa, all of Gunma; Tokuji Ashimi; Hiroyuki Yoshino, both of Tokyo, all of Japan

[73] Assignees: Governor of Gunma-ken, Maebashi; Nakamuraya Co., Ltd., Tokyo, both of Japan

[21] Appl. No.: 114,674

[22] Filed: Oct. 29, 1987

[30] Foreign Application Priority Data

Oct. 9, 1987 [JP] Japan ................................ 62-255289

[51] Int. Cl.[4] ........................ A23L 1/314; A23L 1/317
[52] U.S. Cl. .................................... 426/574; 426/641; 426/646; 426/652; 426/804
[58] Field of Search ............... 426/574, 641, 646, 652, 426/802, 804, 513

[56] References Cited

U.S. PATENT DOCUMENTS

| 4,362,752 | 12/1982 | Sugino et al. | 426/574 X |
| 4,427,704 | 1/1984 | Cheney et al. | 426/574 X |
| 4,464,404 | 8/1984 | Ueno et al. | 426/574 X |
| 4,603,054 | 7/1986 | Schmidt et al. | 426/574 |
| 4,615,901 | 10/1986 | Yoshioka et al. | 426/802 X |
| 4,676,976 | 6/1987 | Toba et al. | 424/485 |

FOREIGN PATENT DOCUMENTS 2149639 6/1985 United Kingdom ................ 426/574

OTHER PUBLICATIONS

Ochi, "Preparation of Low-Calorific Meat Product", Jap. Pat. Abstract, 61-19467, 1-∞-86.
Uchida et al., "Production of Konnyaku", Jap. Pat. Abstract, 61-257156, 11-14-86.
Mouri et al., "Method of Forming Coating Films and Food Product Coated With Them", Jap. Pat. Abstract, 57-94279, 6-11-82.
"Relationship Between Stress Relaxation and Syneresis of Konjac Mannan Gel", Maekaji et al., Agric. Biol. Chem., 48 (1), 227-228, 1984.

*Primary Examiner*—Arthur L. Corbin
*Attorney, Agent, or Firm*—Flynn, Thiel, Boutell & Tanis

[57] ABSTRACT

Processed meat products comprising a thermally treated, uniform mixture of a meat and a konjac mannan gel. The konjac mannan gel is obtained by steaming a sol of konjac mannan gel. The meat product has a reduced calorific value and a high content of fibers derived from the konjac mannan gel. The meat product is rather tender and has a good feeling upon eating without involving slipness. A method for making such meat products is also described.

8 Claims, No Drawings

PROCESS FOR MAKING MEAT PRODUCTS CONTAINING A KONJAC MANNAN GEL

BACKGROUND OF THE INVENTION

1. Field of the Invention

This invention relates to low-caloric processed meat products and more particularly, to an improvement in such meat products in which a specifically treated KONJAC MANNAN GEL (as described in Agri. Bio. Chemi., 48 (1), 227–228, 1984) is utilized so that the resultant meat products have a low calorific value with an increasing content of fibers in the meat product. The invention also relates to a method for making the processed meat products. The processed meat products used herein are intended to mean various meat products, including, for example, patties, terrines, meat loaves, sausage, shu-mai, dumplings stuffed with minced pork or gyoza, meat balls, meat buns and the like.

2. Description of the Prior Art

In general, ordinary processed meat products are made typically by a process which comprises the steps of chopping or cutting a meat into fine pieces by a suitable means, adding, if necessary, additives such as fine pieces of vegetables, fats, starch and the like to the meat pieces, further adding seasonings and spices to the mixture, and subjecting the resultant mixture, as it is or after further addition of other materials, to a heat treatment such as boiling, baking, steaming or smoking. Most known meat products have been served chiefly as highly calorific and high protein foods.

Because of the high calorific value and the high lipid and protein content with a small content of fibers, the processed meat products are considered to be one of main causes for diseases of adult people accompanied by the excess intake of calorific energy and the shortage of fibers. This is the serious problem involved in the diet of the present day. Accordingly, there is a demand for foods which have a lower calorific value and reduced content of lipids and proteins with an increasing amount of fibers.

If it is intended to reduce the nutritive value of processed foods, the usual practice is to add a material whose nutritive power is far less than that of the processed food or is completely free of such nutritive power. For better results, the material to be added should be free of any nutritive power. Examples of the material may include not only konjac mannan gel, but also mushrooms, algae, tea leaves and the like. However, the materials other than the konjac mannan gel all have peculiar flavors and tastes, and are significantly different in physical properties from meats.

The mere addition of water to a processed meat food in larger amounts may result in a lower nutritive value, but the resultant food is a so-called "sloppy" food whose physical properties greatly vary with a lowering in quality of the food.

The konjac mannan gel has no nutritive value and is mainly composed of konjac gluco-mannan of hemicellulose, thus containing fibers which are important for the sake of health. However, meat products to which an ordinary konjac mannan gel has been added are not favorable and are rather objectionable because of the inherent properties of the konjac mannan gel. More particularly, the meat products containing the konjac mannan gel are generally hard or tough and brittle with an inherent odor of the konjac mannan gel which is not agreeable. Thus, such meat products are of little commercial value.

SUMMARY OF THE INVENTION

It is therefore an object of the invention to provide processed meat products which comprise a food additive made from konjac mannan gel having no nutritive value and having inherent physical properties such as elasticity, toughness and the like, which are suitable for use in combination with meats.

It is another object of the invention to provide processed meat products which are in conformity with the modern diet because of the low nutritive value of the product, but are favorable in taste and have a good feeling on eating.

It is a further object of the invention to provide processed meat products which have a remarkably improved quality based on the incorporation of a konjac mannan gel into the product and which contains fibers derived from konjac gluco-mannan of the konjac mannan gel.

It is a still further object of the invention to provide a method for making a processed meat product in which a konjac mannan gel is prepared by a specific process.

The above objects can be achieved, according to the invention, by a processed meat product which comprises a thermally treated, uniform mixture of pieces of a meat and pieces of a konjac mannan gel. The processed meat product used herein is intended to mean those products which are obtained by heat treatment of the mixture such as boiling, smoking, steaming, baking and the like as is well known in the art of processing meats. The term "meat" means all edible meats such as pork, beef, chicken, mutton and the like.

DETAILED DESCRIPTION AND EMBODIMENTS OF THE INVENTION

As described above, the present invention is characterized by incorporating pieces of a konjac mannan gel in a mixture with meat pieces. The konjac mannan gel used in the invention is a specifically treated konjac mannan gel which has a reduced degree of objectionable odor as would be involved in known counterparts. In addition, the konjac mannan gel of the invention does not become tough and brittle when uniformly mixed with a meat.

A known konjac mannan gel is generally made by a process in which a konjac powder is mixed with water at a ratio by weight of 1:30 to 40 under agitation. Subsequently, the mixture is allowed to stand for 2 to 3 hours at normal temperatures or for 30 to 60 minutes when hot water of about 70° C. is used, thereby obtaining a konjac paste. In order to impart a desired degree of toughness or hardness, calcium hydroxide is added in an amount of from 0.4 to 0.6 wt% based on the konjac powder after the konjac powder is suspended in water and is kneaded together. Immediately, the mixture is placed in a desired casing and coagulated, followed by further heating in hot water to promote the coagulation to obtain a konjac mannan gel. This known product is widely used in Japan, but has the drawbacks described before, including the peculiar and rather objectionable odor. This odor is chiefly based on the calcium hydroxide used.

In the practice of the invention, which the gel or konjac mannan gel is prepared as having a less degree of the inherent odor, it is improved in physical properties and is imparted with elasticity, tenderness and the like and has a certain level of water retention. For this purpose, the konjac mannan gel is made as follows.

Konjac powder is added to cold water of about 8° C. under agitation and allowed to stand in a refrigerator at 2° to 8° C. for 8 to 24 hours until the mixture is slowly converted into a uniform paste or sol as in the ordinary case. Preferably, the mixing ratio of the konjac powder and the cold water is in the range of from 1:50 to 1:60. Separately, a coagulant such as calcium hydroxide, potassium carbonate and/or sodium carbonate, is suspended in water in a suitable amount. Preferably, the amount ranges from 0.4 to 0.6 wt% in total of the konjac paste, and the coagulant is a mixture of calcium hydroxide, potassium carbonate and sodium carbonate for the reason described hereinafter. This suspension is added to the paste until the pH reaches from 9 to 12. The mixture is kneaded together and placed in a suitable mold or casing and allowed to stand for 30 to 40 minutes to permit the coagulation reaction to proceed gradually. The mixture is then steamed, for example, in a steamer for 20 to 40 minutes to complete the reaction. The steaming step enables one to coagulate the sol into a gel without causing the water in the sol to escape as is different from the ordinary case where hot water is used for the coagulation.

When calcium hydroxide having an intense odor is used in combination with potassium carbonate and/or sodium carbonate as the coagulant, the peculiar odor of the final gel or konjac mannan gel is reduced. For instance, exposure of an about 30 mm thick piece of the konjac mannan gel to water can substantially eliminate the odor. During the exposure, the water contained in the piece is kept substantially constant since the coagulation by steaming is complete.

At the time of the preparation of the konjac paste, edible additives such as table salt, alubmen, oils or fats and starch may be used singly or in combination, if necessary. In this case, the table salt is preferably used in an amount of from 0.5 to 2.2 wt% of the total konjac mannan gel composition. The albumen is preferably used in an amount of from 3.0 to 6.0 wt% of the total composition and the oil or fat is preferably in the range of from 2.0 to 4.5 wt% of the total composition. The starch is used in an amount of from 0.5 to 1.0 wt% of the total composition.

The thus obtained konjac mannan gel may be added to a starting meat in amounts not larger than 60 wt%, preferably from 30 to 60 wt%, of the total composition, within which the nutritive value of the resultant meat composition can be arbitrarily controlled.

Because an ordinary konjac mannan gel is rather unlikely to be reduced into pieces and has poor miscibility with meat, the resultant meat composition exhibits a felling different from a processed meat product free of konjac mannan gel and there also is a poor affinity between the konjac mannan gel and the meat pieces. In contrast, the konjac mannan gel obtained according to the invention is so tender that it can be readily broken into pieces similar to a meat and has good miscibility with the meat. This permits a final processed meat product to be rather tender and to have a good feeling upon eating without involving sloppiness.

The meats used for this purpose may be beef, pork, chicken, mutton and mixtures thereof. In accordance with the method of the invention, konjac mannan gel is added to a meat and divided into fine pieces by any suitable means such as a high speed cutter or chopper. Thereafter, food additives such as seasonings, spices and protein additives may be added to the pieces, if necessary. The resultant mixture is shaped in a suitable form and thermally treated. The thermal treatment may be boiling, smoking, steaming, baking or the like. Preferably, a starting meat, with or without adding an animal oil or fat, is salted and chopped, after which a predetermined amount of the konjac mannan gel is added for cutting, mixing or kneading. The animal oil or fat may be tallow or lard. If the meat is salted, 1.0 to 2.5 wt% of the table salt, based on the meat, is used and allowed to stand at 2° to 5° C. for 12 to 36 hours. For the mixing of the meat and the konjac mannan gel, the mixture is divided into fine pieces by means of a high speed cutter within a short time of, for example, 2 to 5 minutes. The mixing is conducted, for example, by a known vertical mixer.

As a matter of course, protein additives such as albumen, egg and the like may be added prior to the addition of the seasonings and spices. The types of seasonings and spices may vary depending on the type of final processed meat product. Specific seasonings and spices will be shown in examples appearing hereinafter.

When the thermal treatment is boiling, it is preferred that it is effected at 70° to 90° C. for 60 to 100 minutes. Similarly, smoking with wood is effected over 60 to 120 minutes. Baking is carried out at 280° to 320° C. Steaming is effected over 15 to 20 minutes.

The present invention is more particularly described by way of examples.

EXAMPLE 1

| Formulation of konjac mannan gel: | |
| --- | --- |
| Konjac powder | 28 g |
| Water | 1320 ml |
| Table salt | 30 g |
| Salad oil | 60 g |
| Albumen | 80 g |
| Starch | 80 g |
| Coagulant (calcium hydroxide, potassium carbonate and sodium carbonate) | 7.2 g |
| Total | 1600 g |

The konjac powder, table salt, salad oil, albumen and starch were added to cold water of 5° C. under agitation and allowed to stand at about 2° to 5° C. in a refrigerator for 8 to 24 hours to obtain a uniform paste or sol. Thereafter, an aqueous suspension of the coagulant was added to the paste until the pH reached from 9 to 12 and kneaded sufficiently. The mixture was placed in a box and allowed to stand for 1 hour, thereby causing the coagulation reaction to proceed gradually. Thereafter, the contents in the box was subjected to steaming in a steamer for 30 minutes to complete the coagulation reaction. The ratio by weight of the konjac powder and the water was 1:57.1, which was larger than in an ordinary case. The resultant konjac mannan gel was subjected to measurement of physical properties including hardness, cohesiveness, elasticity, chewiness, and shear force. The measurement was effected by the use of a texturometer using a V-form plunger under conditions of a voltage of 2 volts, a clearance of 1 mm and a sample thickness of 2.5 cm. For comparison, a commercially available product was also measured. The results are shown Table 1 below.

TABLE 1

|  | (texturo units) | | | | |
| --- | --- | --- | --- | --- | --- |
|  | Hardness | Cohesiveness | Elasticity | Chewiness | Shear Force |
| Konjac mannan gel of Invention: |  |  |  |  |  |
|  | 0.57 | 0.43 | 0.78 | 0.19 | 6.49 |
|  | (43.2)* | (95.6) | (100) | (41.3) | (44.9) |
| Commercial Product: |  |  |  |  |  |
|  | 1.32 | 0.45 | 0.78 | 0.46 | 14.47 |

*The values in parentheses are ratios by percent to the measurements of the commercial product.

In the above formulation, salad oil may be replaced by sesame oil in the same amount as in this example, thereby obtaining a similar gel or konjac mannan gel.

EXAMPLE 2

Preparation of Terrine 2,500 g of the konjac mannan gel obtained in Example 1 was placed in running water for 10 minutes and allowed to stand 24 hours to eliminate the odor of the konjac mannan gel. The konjac mannan gel is contained in an amount of from 30 to 60 wt% of the product. 3,500 g of lean pork and 1000 g of lard were chopped and mixed with the konjac mannan gel along with 15 g of a binder, a suitable amount of a coloring matter and 50 g of an animal protein, and then subjected to a high speed cutter for reduction into finer pieces and uniform mixing. Subsequently, 15 g of sodium glutamate and a suitable amount of pepper were added to the mixture. This mixture was filled in a casing and smoked or boiled in water, thereby obtaining a terrine product.

The above procedure was repeated using lean beef and tallow instead of lean pork and lard, thereby obtaining another type of terrine.

EXAMPLE 3

Preparation of Hamburger 900 g of lean beef and 200 g of tallow or 1500 g of lean pork was chopped and mixed with 1500 g of the gel obtained in Example 1, which had been finely divided to the same extent as the chopped meal, along with 750 g of minced onion, 400 g of bread crumbs and 130 g of eggs. Suitable amounts of garlic, nutmeg and pepper powders and 45 g in total of seasonings including sodium glutamate, table salt and sugar were added to the mixture, followed by ordinary procedures including tapping and baking, to obtain hamburger foods.

The food product obtained in Example 2 and a commercial terrine product, which was free of any konjac mannan gel, were subjected to measurement of nutritive value and the components contained therein. The results are shown in Table 2 below.

TABLE 2

|  | (wt %) | | | | | |
| --- | --- | --- | --- | --- | --- | --- |
|  |  |  |  | Carbohydrate | | Calorific |
|  | Water | Protein | Lipid | Non Fibrous | Fiber | Ash | Value Kcal |
| Terrine of Invention: | | | | | | | |
|  | 67.0 | 12.6 | 15.6 | 0.8 | 1.6 | 2.4 | 194 |
|  |  |  |  |  | (3.7) |  |  |
| Commercial Terrine: | | | | | | | |
|  | 60.3 | 14.2 | 20.7 | 2.3 | 0 | 2.5 | 252 |
|  |  |  |  |  | (1.8) |  |  |

Note: The values in parentheses are those of dietary fibers.

As will be apparent from the above results, the addition of the konjac mannan gel results in an increase of moisture by about 7% and a decrease of lipid content by about 5% and protein content by about 2%. The calorific value is lowered by about 23%. Moreover, the fiber content increases to 1.6%, which is comparable to fiber-rich vegetables such as a leaf mustard, a turnip, a burdock and the like. Thus, a significant improvement in calorific value is noted.

The terrine products used above were also subjected to an sensory analysis according to a paired comparison method (t test) conducted by 30 panelers. The results are shown in Table 3 below.

TABLE 3

| Inventive Terrine Compared with Commercial Product | −3 −2 −1 0 1 2 3 | Inventive Terrine Compared with Commercial Product | Average Value of the Inventive Product | t Value |
| --- | --- | --- | --- | --- |
| Less reddish in section |  | More reddish in section | −1.200 | 8.163* |
| Coarser texture in section |  | Finer texture in section | −0.167 | 0.895 |
| Tougher on eating |  | More tender on eating | 1.400 | 7.918** |

TABLE 3-continued

| Inventive Terrine Compared with Commercial Product | −3 −2 −1 0 1 2 3 | Inventive Terrine Compared with Commercial Product | Average Value of the Inventive Product | t Value |
| --- | --- | --- | --- | --- |
| Higher degree of meat taste | | Lower degree of meat taste | −0.233 | 1.191 |

Note:
−3 = remarkably,
−1 = slightly,
1 = slightly,
3 = remarkably
−2 = fairly,
0 = no difference,
2 = fairly,
t (30,0.05)
t (30,0.01)
*means a significant level at 5%)
**means a significant level at 1%)

From the above results, little or no difference between the products of the invention and the comparison product is recognized with respect to the texture in section and the meat taste. As for tenderness, a significant difference is shown, i.e. the product of the invention is evaluated as tender at a significan level of 1%. Thus, the tenderness of the processed meat product is improved. The tinge in red of the section may be imparted by the incorporation of coloring matters, if necessary.

Moreover, the above samples were, respectively, subjected to the measurement of physical properties by means of a texturometer under conditions of a sample thickness of 12 mm, a voltage 1 volt, a punger of Lucite 18, a bite speed of "low" and a clearance of 3 mm. The results are shown in Table 4 below.

TABLE 4

| (Texturo Unit) | | | | |
| --- | --- | --- | --- | --- |
| toughness | cohesiveness | elasticity | Shearing force | Chewiness |
| Product of Invention: | | | | |
| 2.97 | 0.55 | 1.1 | 12.5 | 1.83 |
| Commercial Product: | | | | |
| 6.34 | 0.61 | 1.1 | 24.1 | 4.41 |

As will be apparent from the above results, the toughness, shearing force and chewiness properties are reduced to half those of the commercial product, but little differences are found with respect to the elasticity and the coagulation. Thus, the product of the invention is rendered soft or tender and is not sloppy in spite of a larger content of moisture.

The meat composition of the invention comprising a specifically treated konjac mannan gel may be applied to all known processed meat products which are thermally treated. This composition enables one to reduce or control the calorific value of processed meat products, while increasing the fiber content. In addition, tender meat products can be prepared. Thus, a diet can be improved in a healthy fashion.

What is claimed is:

1. A method for making a process meat product comprising the steps of: adding konjac powder to cold water under agitation to form a mixture, said konjac powder being added to said cold water in a weight ratio of 1:50 to 1:60; allowing the mixture to stand and be converted into a uniform paste; adding a coagulant to the paste, said coagulant consisting of a mixture of calcium hydroxide, sodium carbonate and potassium carbonate; steaming the paste for a time sufficient to coagulate the paste and form a konjac mannan gel; providing a meat; dividing the meat and konjac mannan gel into fine pieces while mixing said meat and konjac mannan gel; shaping the fine pieces into a shaped product; and thermally treating the shaped product.

2. A method for making a processed meat product comprising the steps of: adding konjac powder to cold water under agitation to form a mixture; allowing the mixture to stand at 2° to 8° C. for 8 to 24 hours and be converted into a uniform paste; adding a coagulant to the paste, said coagulant consisting of a mixture of calcium hydroxide, sodium carbonate and potassium carbonate; steaming the paste for a time sufficient to coagulate the paste and form a konjac mannan gel; providing a meat; dividing the meat and konjac mannan gel into fine pieces while mixing said meat and konjac mannan gel; shaping the fine pieces into a shaped product; and thermally treating the shaped product.

3. A method for making a processed meat product comprising the steps of: adding konjac powder and an additive selected from the group consisting of table salt, albumen and mixtures thereof, to cold water under agitation to form a mixture; allowing the mixture to stand and be converted into a uniform paste; adding a coagulant to the paste, said coagulant consisting of a mixture of calcium hydroxide, sodium carbonate and potassium carbonate; steaming the paste for a time sufficient to coagulate the paste and form a konjac mannan gel; providing a meat; dividing the meat and konjac mannan gel into fine pieces while mixing said meat and konjac mannan gel; shaping the fine pieces into a shaped product; and thermally treating the shaped product.

4. A method according to claim 3, wherein said food additive is table salt used in an amount of from 0.5 to 2.2 wt%.

5. A method according to claim 3, wherein said food additive is albumen used in an amount of from 3.0 to 6.0 wt%.

6. A method according to claim 3, wherein said food additive is a mixture of from 0.5 to 2.2 wt% of table salt and from 3.0 to 6.0 wt% of albumen.

7. A method for making a processed meat product comprising the steps of: adding konjac powder to cold water under agitation to form a mixture; allowing the mixture to stand and be converted into a uniform paste; adding a coagulant consisting of a mixture of calcium hydroxide, sodium carbonate and potassium carbonate to the paste, said coagulant being added in an amount of from 5 to 10 wt.% of the konjac powder; steaming the paste for a time sufficient to coagulate the paste and form a konjac mannan gel; providing a meat; dividing the meat and konjac mannan gel into fine pieces while mixing said meat and konjac mannan gel; shaping the fine pieces into a shaped product; and thermally treating the shaped product.

8. A method of making a processed meat product comprising the steps of: adding konjac powder and an additive selected from the group consisting of table salt, albumen, and mixtures thereof, to cold water under agitation to form a mixture, said cold water being at a temperature of about 5°-8° C. and said konjac powder being added to said cold water in a weight ratio of 1:50 to 1:60; allowing the mixture to stand at 2° to 8° C. for 8 to 24 hours and be converted into a uniform paste; adding a coagulant consisting of a mixture of calcium hydroxide, sodium carbonate and potassium carbonate, to the paste, said coagulant being added in an amount of from 5 to 10 wt.% of the konjac powder; steaming the paste for a time sufficient to coagulate the paste and form a konjac mannan gel; providing a meat; dividing the meat and konjac mannan gel into fine pieces while mixing said meat and konjac mannan gel; shaping the fine pieces into a shaped product, and thermally treating the shaped product.

* * * * *